March 10, 1964

W. E. REASER 3,124,016

DRILLING MACHINE

Filed July 30, 1962

INVENTOR.
WARREN E. REASER
BY
ATTORNEYS

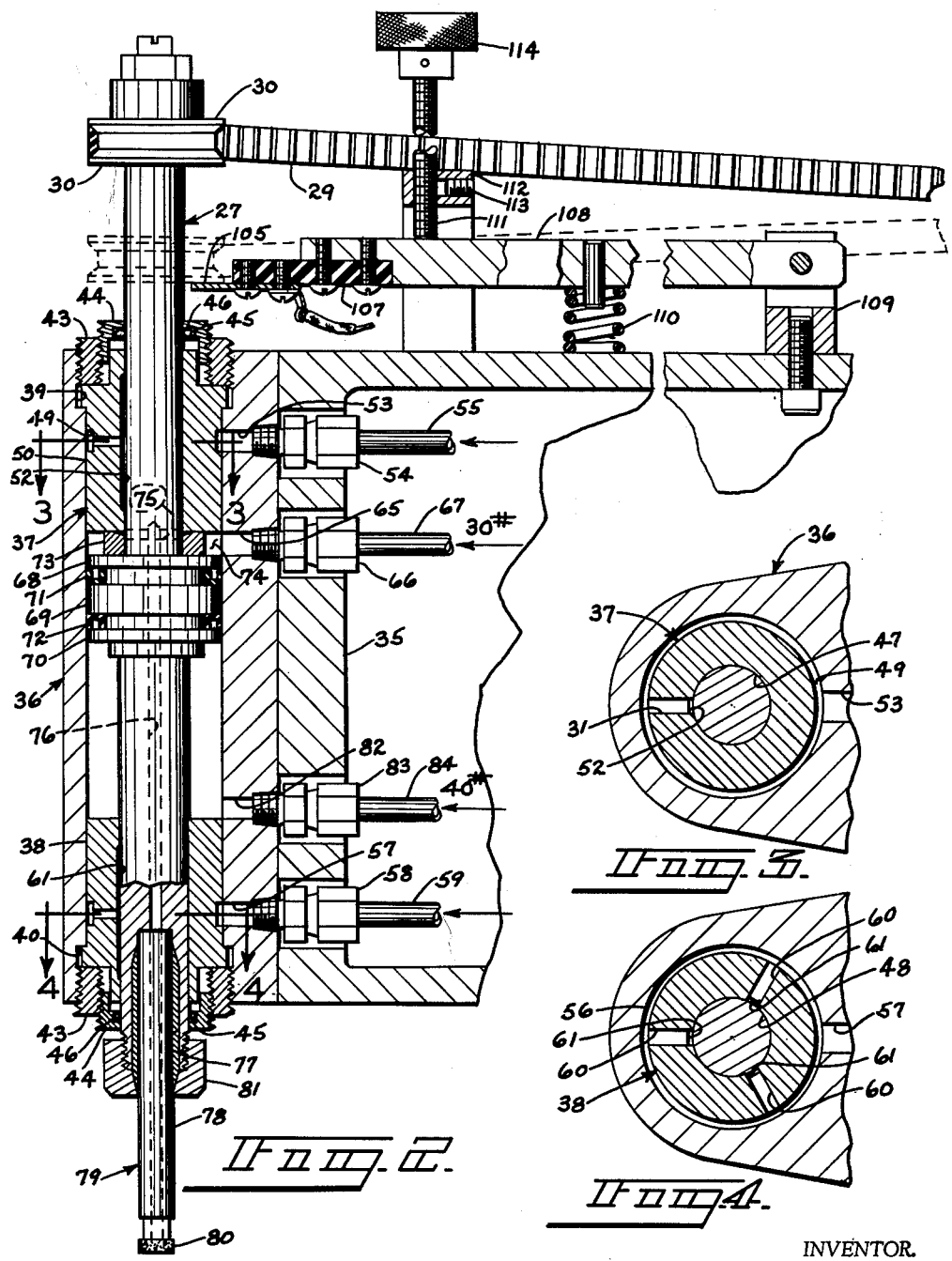

March 10, 1964  W. E. REASER  3,124,016
DRILLING MACHINE

Filed July 30, 1962  3 Sheets-Sheet 3

INVENTOR.
WARREN E. REASER
BY Owen + Owen
ATTORNEYS

United States Patent Office 3,124,016
Patented Mar. 10, 1964

3,124,016
DRILLING MACHINE
Warren E. Reaser, Toledo, Ohio, assignor to The Sun Tool and Machine Company, Toledo, Ohio, a corporation of Ohio
Filed July 30, 1962, Ser. No. 213,448
12 Claims. (Cl. 77—21)

This invention relates to a drilling machine and, more particularly, to a drilling machine having two axially aligned drilling spindles which are moved toward each other from opposite sides of the work by hydraulic feeding mechanisms.

The invention will be illustrated as embodied in a machine for drilling holes in glass plates wherein one of the two opposed aligned spindles moves only far enough to feed its drill into the glass plate a short distance and then retracts and the other of the two axially aligned spindles moves into the glass plate a distance sufficient to remove any burrs which may have been left by the first drilling spindle.

As is well known in the art of drilling glass it is not desirable to drill a hole from only one side of the glass because when the drill penetrates through the opposite face of the glass it is likely to break or chip the glass. It is also well known to eliminate this problem by drilling from opposite sides of the glass with two aligned drills.

It is the principal object of the instant invention to provide a machine for drilling holes in sheets of glass wherein each of the drilling cycles is under a simple automatic control and wherein the feeding force for the drilling spindles is provided by hydraulic mechanism utilizing a liquid which also serves as a lubricant for the drills.

It is yet another object of the instant invention to provide an automatic cycling drilling machine for drilling holes in sheets of glass wherein the distance of penetration of each of two opposed aligned drills can be adjusted and set with respect to any thickness of glass being drilled in the machine and which will repetitively perform the same cycle of operations without further attention by its operator except to initiate each cycle.

These and other more specific objects and advantages directed to the particular mechanism and combination of elements embodying the invention will be better understood from the specification which follows and from the drawings in which:

FIG. 2 is a fragmentary vertical sectional view taken along the line 2—2 of FIG. 1 and shown on an enlarged scale, the view showing only one of the two opposed, aligned, drilling spindles but illustrating both since the two are substantially identical, merely being inverted relative to each other;

FIG. 3 is a fragmentary, horizontal sectional view taken along the line 3—3 of FIG. 2 and shown on an enlarged scale;

FIG. 4 is a fragmentary horizontal sectional view taken along the line 4—4 of FIG. 2 and shown on an enlarged scale;

Figure 1:
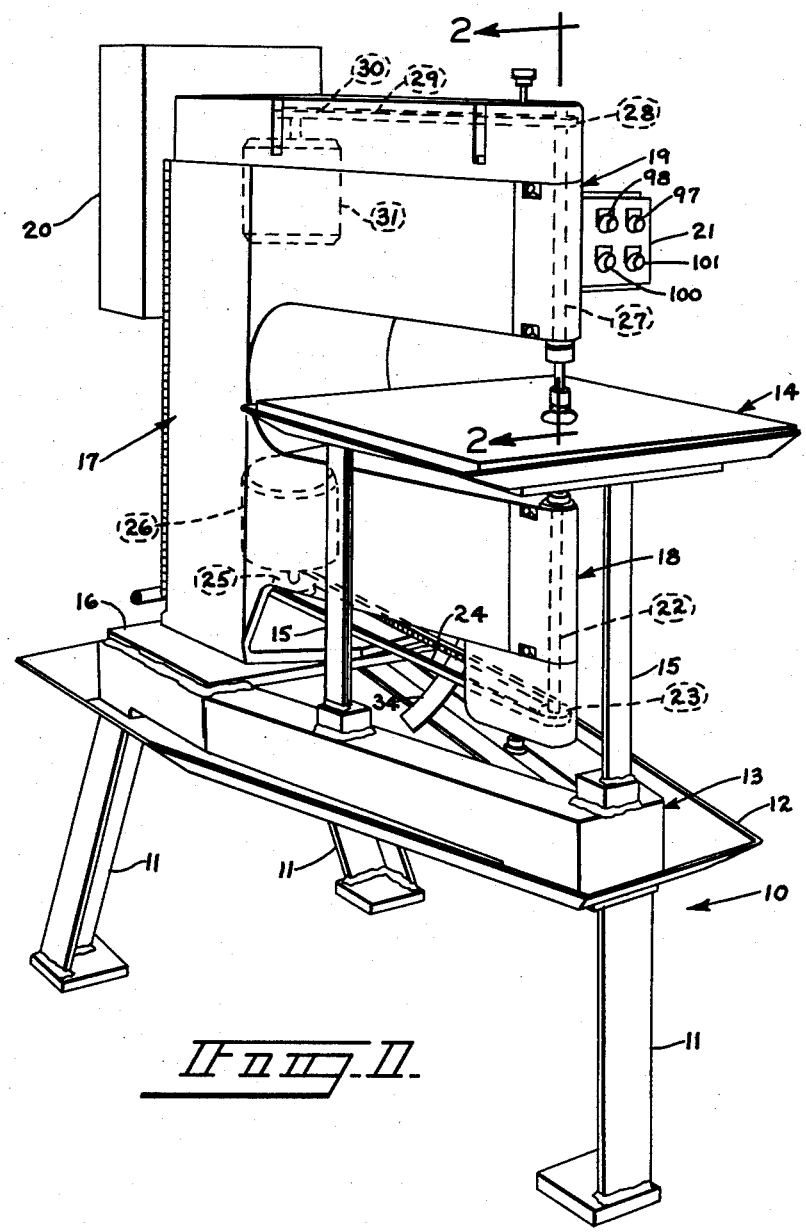
FIG. 1 is a view in front quarter perspective of a drilling machine embodying the invention.

A drilling machine embodying the invention is illustrated in FIG. 1 as being erected upon a stand 10 having support legs 11 and an open topped pan 12 which serves as a base and also as a reservoir for lubricant and hydraulic fluid. A horizontal A-frame 13 lies in the pan 12 and a work table 14 is supported by legs 15 above the A-frame 13. At the rear of the A-frame 13 there is located a bed plate 16 upon which is erected a generally C-shaped housing 17, a lower arm 18 of the housing 17 extending forwardly beneath the table 14 and an upper arm 19 of the housing 17 extending forwardly and overlying the table 14. The upper and lower arms 19 and 18 define a space of substantial depth providing for the placing of sheets of glass on the table 14 and for the drilling of holes in such sheets of glass at a considerable distance from their edges.

An electrical circuit box 20 is mounted at the upper rear end of the housing 17 and a control box 21 is mounted at the front end of the upper arm 19 in a position for ready access by an operator.

The lower arm 18 encloses a lower drilling spindle 22 on the lowermost end of which is pinned or otherwise secured a pulley 23. The pulley 23 is engaged by a driving belt 24, the belt 24 also being engaged with a power pulley 25 mounted on the shaft of a lower driving motor 26. Similarly, the upper arm 19 of the housing 17 encloses a mounting for an upper spindle 27 having a driving pulley 28 which is engaged by a belt 29 driven by power pulley 30 on the shaft of an upper drive motor 31 mounted within the upper arm 19. The housing 17 also contains a pump 32 (not shown in FIG. 1 but illustrated in FIG. 5) and a pump motor 33 (not shown in FIG. 1 but indicated in FIG. 6) along with suitable piping, pressure regulators and valves as will be described below and including exhaust lines 34, for the return of hydraulic fluid to the sump provided by the open topped pan 12.

Each of the two spindles 22 and 27 is similarly mounted, lubricated, fed, retracted and controlled. FIG. 2 illustrates the construction of the upper spindle 27, a description of which also serves for the lower spindle 22. An upper cantilever frame 35 is located within the upper arm 19 of the housing 17 and, at its forward end, rigidly supports a feeding cylinder generally indicated by the reference number 36. The feeding cylinder 36 functions not only to support the spindle 27 for rotation but also to serve as a hydraulic cylinder within which the spindle 27 is both fed and retracted by suitably applied hydraulic force. The spindle 27 is journaled in the cylinder 36 by upper and lower hydraulic bearings 37 and 38. The main portion of the cylinder 36 has a tubular bore and near its upper and lower ends has annular shoulders 39 or 40 against each of which is seated an annular collar 41 or 42, respectively, of the two hydraulic bearings 37 and 38. Each of the bearings 37 and 38 is retained in the upper or lower end of the cylinder 36, as the case might be, by a retaining ring 43 which is threaded into the open upper or lower end of the cylinder 36 and which also has an inner threaded surface for the engagement therein of an exteriorly threaded sealing ring 44. Each of the sealing rings 44 has an annular inner recess 45 in which is located an O-ring 46.

The two hydraulic bearings 37 and 38 have axially aligned bores 47 and 48, respectively, of diameters to function as bearings for the spindle 27. The upper hydraulic bearing 37 has a single annular groove 49 cut in its outer surface 50 and communicating with a single radial passageway 51 which leads through the body of the bearing 37. The radial passageway 51 intersects an axially extending groove 52 that is cut in the interior surface forming the bore 47 and is located at the front side of the bearing 37. The annular groove 49 communicates with a liquid inlet bore 53 drilled through the back of the cylinder 36 and threaded for the reception of a coupling 54 on the end of a hydraulic line 55.

The lower hydraulic bearing 38 is somewhat similarly constructed having an annular groove 56 (see also FIG. 4) aligned with and in communication with a supply or inlet bore 57 which is threaded for the reception of a coupling 58 on the end of a hydraulic line 59. Three radially inwardly extending passageways 60 lead from the groove 56 through the body of the lower bearing 38 to three axial grooves 61. One of the three grooves 61 is at the front of the bearing 38 and the other two are evenly spaced 120 degrees therefrom.

The hydraulic lines 55 and 59 (see FIG. 5) are connected to a common source line 62 which in turn is connected through a regulator valve 63 to a supply line 64 from the pump 32. Hydraulic fluid from the pump 32 is fed through the piping just described and to the annular grooves 49 and 56 of the upper and lower bearings 37 and 38, respectively, thence passing inwardly through the single radial passageway 51 of the upper bearing 37 and the three radial passageways 60 of the lower bearing 38 to the respective axial grooves 52 or 61. There is only one axially extending groove in the upper bearing 37 as contrasted to three in the lower bearing 38 because rotation of the spindle 37 under power delivered by the driving belt 29 applies a rearward thrust to the upper end of the spindle 27. This causes the spindle 27 to rest at the rear of the upper bearing 37 so that if there were an axial groove at the rear it would be closed by the spindle 27. On the other hand, because the spindle 27 is thrust rearwardly at its upper end, the space between the spindle 27 and the inner surface of the bore 47 of the upper bearing 37, tends to be open at the front so that the lubricating liquid in the groove 52 clings to the rotating surface of the spindle 27 and is carried around with the spindle 27 to lubricate it throughout its contact with the upper bearing 37.

A liquid inlet port 65 extends radially inward through the rear wall of the cylinder 36 at a level just below the lower end of the upper hydraulic bearing 37. The port 65 is threaded for the reception of a coupling 66 for a low pressure hydraulic feeding line 67. For example, liquid in the line 67 may be supplied at a pressure of 30 p.s.i. The port 65 communicates with the interior of the feeding cylinder 36 just above the uppermost one of three flanges 68, 69 and 70 on the spindle 27 which retain two sealing rings 71 and 72 and form a piston for the spindle 27. A spacing washer 73 surrounds the spindle 27 just above the uppermost flange 68 and to provide an annular chamber 74 above the flange 68 and also to seal off a radial passage 75 drilled through the spindle 27 at a level above the uppermost flange 68 and which connects to an axial passage 76 in the spindle 27. Liquid fed into the chamber 74 tends to thrust the spindle 27 downwardly to feed it toward and into the work. Immediately upon departure of the spindle 27 from its uppermost position the washer 73 departs from the lower end of the upper hydraulic bearing 37 and opens the passageways 75 and 76 for flow of fluid therethrough. A restriction caused by the smaller diameter of the passageway 76 relative to the supply port 65 provides sufficient resistance to the flow of the liquid to insure the feeding downwardly of the spindle 27 by the application of the pressure in the liquid to the piston head formed by the flanges 68-70 and sealing rings 71 and 72.

Near the lower end of the spindle 27 the bore 76 communicates with an enlarged socket 77 in the spindle 27 which is suitably slotted axially to function as a collet for the reception and retention of a hollow stem 78 of a drill 79 having a drilling point 80. A collet nut 81 is threaded on the exterior of the end of the spindle 27 in order to tighten the collet thus formed around the stem 78 of the drill 79. By this arrangement liquid supplied to the line 67 functions both to feed the spindle 27 and drill 79 downwardly and to serve as a lubricant flowing through the hollow interior of the drill 79 to the material into which the point 80 is drilling.

A power fluid port 82 is drilled through the wall of the feeding cylinder 36 at a level just above the upper end of the lower bearing 38, and threaded to receive a coupling 83 of a high pressure power line 84. Liquid admitted through the line 84 applies pressure to the underside of the flange 70 for the purpose of retracting the spindle 27 by overcoming the pressure existing in the line 67 and in the chamber of the cylinder 36 above the flange 68. Thus with liquid in the line 67 at 30 p.s.i., the liquid may be admitted to the line 84 at 40 p.s.i. when it is desired to retract the spindle 27 to withdraw the drill 79 from the work.

The power liquid line 67 (see FIG. 5) is connected by a line 85 to the source line 62 of the 30 p.s.i. liquid and the power liquid line 84 is connected through a flow control valve 86 and a solenoid actuated three-way valve 87 to a source line 88 controlled by a regulating valve 89 and connected by a line 90 to the pump 32. A pair of similar power liquid lines 91 and 92 are similarly coupled to a feeding cylinder 93 for the lower spindle 22. The lines 91 and 92, respectively, are connected by the line 85 to the low pressure source line 62 and through a flow control valve 86a and a second solenoid actuated three-way valve 94 to the source line 88 and the high pressure regulator valve 89. The low pressure liquid is fed to the low pressure feeding lines 67 and 91 and also to the lubricating lines 55 and 59 of the upper spindle 27 and to a similar pair of lubricating lines 95 and 96 for the lower feeding cylinder 93.

Figures 5, 6:
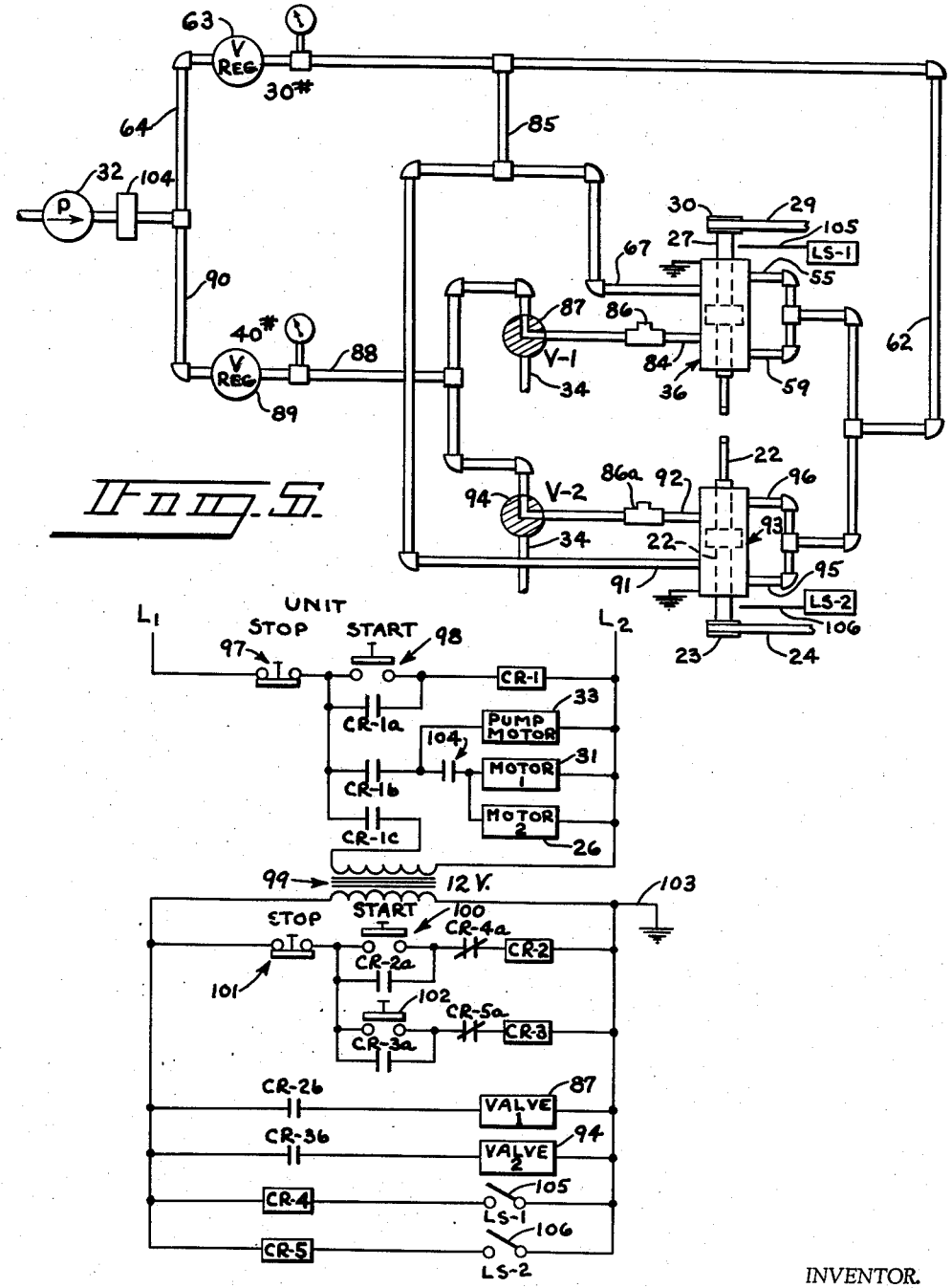
FIG. 5 is a simplified hydraulic diagram for actuation of a drilling machine embodying the invention and also showing some electrical control means.
FIG. 6 is a simplified, schematic wiring diagram for a machine embodying the invention.

The electrical control circuit for a drilling machine embodying the invention is diagrammatically illustrated in FIG. 6. Power for the pump motor 33, the upper spindle motor 31 and lower spindle motor 26 is supplied from a power line through a "Stop" button 97 which is positioned in the control box 21 and is normally closed. A "Start" button 98 is also positioned in the electrical control box 21, and is electrically connected in series with the "Stop" button 97 and with the coil of a relay CR-1 to the opposite side of the power line. Control relay CR-1 has three sets of normally open contacts: (1) contacts CR-1a being connected around the "Start" button 98 as a "hold in" for the relay CR-1; (2) contacts CR-1b which provide a power circuit for the pump motor 33, upper spindle motor 31 and lower spindle motor 26; and (3) contacts CR-1c which supply power to the primary of a transformer 99 from the secondary of which low voltage, for example 12 volts, current is provided for a cycle control circuit.

The cycle control circuit powered from the transformer 99 includes a two element cycle "Start" switch 100 and a cycle "Stop" switch 101 connected in series therewith, both of the switches being located in the control box 21. The line controlled by the "Start" switch 100 and "Stop" switch 101 includes the coil of a control relay CR-2 and normally closed contact CR-4a of a control relay CR-4. The control relay CR-2 has a pair of normally open contacts CR-2a which shunt around the start switch 100 to hold in the control relay CR-2. A second element 102 of the "Start" switch 100 controls a branch circuit leading through a pair of normally closed contacts CR-5a of a control relay CR-5 and the coil of a control relay CR-3. The control relay CR-3 has a pair of normally open contacts CR-3a which serve to lock in the circuit including the control relay CR-3. One side of the control circuit powered from the transformer 99 is grounded to the frame of the drilling machine by a lead 103.

Control relay CR-2 has a second pair of normally open contacts CR-2b in series in a line with the solenoid actuated three-way valve 87 and control relay CR-3 has a similar pair of normally open contacts CR-3b in series with the solenoid actuated three-way valve 94.

The solenoid actuated valves 87 and 94 are diagrammatically illustrated in FIG. 5 and, in that figure, are shown in their "normal" of power-off positions wherein hydraulic liquid flows from the high pressure source line 88 through the valves 87 and 94 and to the power lines 84 and 92 leading to the upper feeding cylinder 36 and lower feeding cylinder 93, respectively. The three-way valves 87 and 94 are held in their "normal" positions by return springs (not shown), to hold the spindles 27 and 22 in their retracted positions. When the relays CR-2 and CR-3 are energized, as described above, the valves 87 and 94 are shifted to connect the lines 84 and 92, respectively, to the exhaust lines 34.

By reason of the hydraulic and electrical circuits so far described it can be seen that liquid under a pressure of 30 p.s.i. is supplied to the source line 62 for the bearing lines 55, 59, 95 and 96 and also to the feeding lines 67 and 91 as soon as the start switch 98 is closed and the pump 32 energized. At this same time higher pressure liquid is supplied to the source line 88. A pressure controlled switch 104 (FIG. 5) is located in the hydraulic line from the pump 32 to the supply lines 64 and 90 and usually is set at a relatively low pressure, say 10 to 15 p.s.i., so that its contacts remain open unless there is at least some pressure in these lines. The switch 104 is in electrical circuit between the contacts CR-1b of the control relay CR-1 and the spindle motors 31 and 26. Thus if there is no pressure in the hydraulic system the control relay CR-1 does not energize and power does not reach the spindle motors 26 and 31, thus preventing damage to the spindles 26 and 31 or to their bearings 37 and 38 which would result if there were no liquid flowing into these bearings.

When it is desired to start a drilling cycle the operator presses the cycle "Start" switch 100 which closes the circuits already described, energizes the control relays numbers CR-2 and CR-3 to close their respective normally open contacts CR-2b and CR-3b to energize the solenoids of the valves 87 and 94 and to shift them to the exhaust position, taking the higher 40 p.s.i. pressure off of the undersides of the spindle pistons formed by the flanges 70 and sealing rings 72. Liquid trapped in the feeding cylinders 36 and 93 beneath the flanges 72 flows outwardly through the power lines 84 and 92 under the control of the flow control valves 86 which may be adjusted to control the speed with which the spindles 22 and 27 approach the opposite faces of the work under the lower pressure from the lines 67 and 91. As soon as the drill points 80 engage the work, the low pressure on the upper sides of the spindles 22 and 27 feeds them into the work, drilling the hole from opposite sides thereof.

The upper spindle 27 is fed downwardly into the work only a short distance, being stopped when its power pulley 30 contacts a feeler 105 (FIG. 2) of a limit switch designated as LS-1 in FIGS. 5 and 6. Contact of the pulley 30 closes a circuit between ground and the opposite side of the 12-volt control system which energizes the coil of CR-4 to open its normally closed contact CR-4a and to deenergize the coil of control relay CR-2. Deenergization of control relay CR-2 opens it contact CR-2b and deenergizes the solenoid of the three-way valve 87 allowing the valve 87 to restore to its normal position indicated in FIG. 5 so as to apply the higher 40 p.s.i. pressure to the underside of the spindle 27 and cause it to be retracted.

The lower spindle 22 feeds into the work for a distance sufficient to ream out any burr left by the upper drill point 80 and then its pulley 23 contacts a feeler 106 (FIGS. 5 and 6) of a limit switch LS-2 in circuit with the coil to open its contacts CR-5a and drop the coil of relay CR-3 out of circuit so as to deenergize the solenoid of the three-way valve 94 and allow that valve 94 to return to its normally open position indicated in FIG. 5 to apply the higher pressure 40 p.s.i liquid to the piston 22 causing that piston to retract.

Each of the feelers 105 and 106 is mounted as indicated with respect to the feeler 105 in FIG. 2. The feeler 105 is attached to an insulating block 107 which is in turn mounted upon an adjustable lever 108 that is pivoted in a yoke 109 mounted upon the frame casting 35. A spring 110 urges the lever 108 upwardly against an adjustable stop screw 111 threadedly downwardly through a support 112 in which is also located a setscrew 113 for fixing the stop screw 111 in adjusted position. A hand knob 114 is pinned on the upper end of the stop screw 111. As can be seen in FIG. 2, by rotating the hand knob 114 the feeler 105 is moved vertically relative to the upper and lower positions of the spindle 27 so that the point of contact between the power pulley 30 and the feeler 105 may be vertically adjusted thus to control the lowermost point of movement of the spindle 27 and the distance of penetration of its drill point 80 into the work. The pulley 30 and its belt 29 are shown in dotted lines in the lower position just contacting the feeler 105 to establish the circuit for terminating the downward movement of the spindle 27 under power of the low pressure fluid fed thereto through the feeding line 67.

Having described my invention, I claim:

1. In a drilling machine of the class described, in combination, a cylinder, a drilling spindle extending through said cylinder, means for rotating said spindle, vertically spaced rear and front bearings for said spindle mounted one at each end of said cylinder, said spindle having a rear end extending outwardly from said rear bearing, liquid supply passages in said bearings for conducting liquid thereinto for lubricating said spindle in said bearings, a piston on said spindle positioned in said cylinder between said bearings, sealing means on said piston, a feeding liquid line connected to said cylinder behind said piston, means for constantly supplying liquid at feeding pressure to said line, a retracting liquid line connected to said cylinder at the other side of said piston, a source line for liquid at a pressure higher than feeding pressure, an exhaust line, and valve means for alternately connecting said retracting liquid line to said source line and to said exhaust line.

2. A drilling machine according to claim 1 and cycle initiating means for shifting said valve means to position for connecting said retracting liquid line to said exhaust line.

3. A drilling machine according to claim 2 and means including an adjustably positionable element for returning said valve means to position for connecting said retracting liquid line to said source line.

4. A drilling machine according to claim 1 in which said bearings are sleeve-type and bearings and said spindle have interconnecting cylindrical surfaces and each of said bearings has at least one radial liquid passageway leading to the inner surface thereof and a groove cut in its inner surface and extending axially of said spindle for supplying liquid to the bearing contacting surface of said spindle.

5. A drilling machine according to claim 4 in which the means for rotating said spindle comprises a pulley on said spindle and a power driven belt engaged therein and extending radially away from said pulley and in which the rear one of said bearings has only a single axially extending surface groove located at the side of said spindle opposite to the direction of extent of said belt therefrom.

6. In a drilling machine of the class described, in combination, two axially aligned and spaced cylinders, a drilling spindle extending through each of said cylinders, separate means for rotating each of said spindles, vertically spaced rear and front bearings for each of said spindles mounted one at each end of the respective one of said cylinders, each of said spindles having a rear end extending outwardly from the associated one of said rear bearings, liquid supply passages in said bearings for conducting liquid thereinto for lubricating said spindles in said bearings, a piston on each of said spindles positioned in the associated one of said cylinders between said bearings, sealing means on said pistons, a feeding liquid line connected to each of said cylinders behind said pistons, means for constantly supplying liquid at feeding pressure to said lines, a retracting liquid line connected to each of said cylinders at the other side of said pistons, a source line for liquid at a pressure higher than feeding pressure, an exhaust line, and separate valve means for each of said cylinders for alternately connecting the associated one of said retracting liquid lines to said source line and to said exhaust line.

7. A drilling machine according to claim 6 and separate cycle initiating means for each of said spindles for shifting the associated ones of said valves to position for connecting the associated one of said retracting liquid lines to said exhaust line.

8. A drilling machine according to claim 7 and separate spindle reversing means for each of said cylinders each including an adjustably positionable element for returning the associated one of said valves to position for connecting the associated one of said retracting liquid lines to said source line.

9. A drilling machine according to claim 8 in which said valves are normally held in position for connecting said retracting liquid lines to said source line and in which each of said spindle reversing means includes mechanism actuated by feeding movement of the associated one of said spindles a distance determined by said element for restoring the associated one of said valves to normal position.

10. In a drilling machine of the class described, in combination, a cylinder, a drilling spindle extending through said cylinder, means for rotating said spindle, vertically spaced rear and front bearings for said spindle mounted one at each end of said cylinder, said spindle having a rear end extending outwardly from said rear bearing, liquid supply passages in said bearings for conducting liquid thereinto for lubricating said spindle in said bearings, a piston on said spindle positioned in said cylinder between said bearings, sealing means on said piston, a feeding liquid line connected to said cylinder behind said piston, means for supplying liquid at feeding pressure to said line and to said liquid supply passages, a retracting liquid line connected to said cylinder at the other side of said piston, a source line for liquid at a retracting pressure and valve means for selectively supplying liquid under pressure to said retracting liquid line.

11. A drilling machine according to claim 10 in which said bearings are sleeve-type and bearings and said spindle have intercontacting cylindrical surfaces and each of said bearings has at least one radial liquid passageway leading to the inner surface thereof and a groove cut in its inner surface and extending axially of said spindle for supplying liquid to the bearing contacting surface of said spindle.

12. A drilling machine according to claim 11 in which the means for rotating said spindle comprises a pulley on said spindle and a power driven belt engaged therein and extending radially away from said pulley and in which the rear one of said bearings has only a single axially extending surface groove located at the side of said spindle opposite to the direction of extent of said belt therefrom.

References Cited in the file of this patent
UNITED STATES PATENTS

| | | |
|---|---|---|
| 2,406,482 | Tucker | Aug. 27, 1946 |
| 2,539,072 | Gordon et al. | Jan. 23, 1951 |
| 2,647,407 | Hiruonen | Aug. 4, 1953 |
| 2,655,058 | Eschenburg et al. | Oct. 13, 1953 |
| 2,916,333 | Johnson | Dec. 8, 1959 |
| 2,941,338 | Santschi | June 21, 1960 |
| 2,956,453 | Frankenfield | Oct. 18, 1960 |